United States Patent
SadAbadi

(10) Patent No.: US 10,323,470 B2
(45) Date of Patent: Jun. 18, 2019

(54) CONSTANT VELOCITY JOINT APPARATUS, SYSTEMS, AND METHODS

(71) Applicant: Halliburton Energy Services, Inc., Houston, TX (US)

(72) Inventor: Hamid SadAbadi, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/784,471

(22) PCT Filed: Dec. 30, 2014

(86) PCT No.: PCT/US2014/072737
§ 371 (c)(1),
(2) Date: Oct. 14, 2015

(87) PCT Pub. No.: WO2016/108839
PCT Pub. Date: Jul. 7, 2016

(65) Prior Publication Data
US 2016/0326811 A1 Nov. 10, 2016

(51) Int. Cl.
E21B 17/05 (2006.01)
E21B 4/00 (2006.01)
(Continued)

(52) U.S. Cl.
CPC .............. *E21B 17/05* (2013.01); *E21B 4/006* (2013.01); *E21B 4/02* (2013.01); *E21B 7/04* (2013.01);
(Continued)

(58) Field of Classification Search
CPC ..... F16D 3/04; F16D 3/10; F16D 3/26; F16D 3/265; F16D 3/30; F16D 3/34; F16D 3/44;
(Continued)

(56) References Cited

U.S. PATENT DOCUMENTS 899,913 A 9/1908 Shaw
1,314,600 A * 9/1919 McCaskey ................ F16C 1/04
464/147
(Continued)

FOREIGN PATENT DOCUMENTS

CH 241255 A 2/1946
CN 2733071 Y 10/2005
(Continued)

OTHER PUBLICATIONS

"International Application Serial No. PCT/US2014/072737, International Search Report dated Sep. 17, 2015", 4 pgs.
(Continued)

*Primary Examiner* — Matthieu F Setliff
(74) *Attorney, Agent, or Firm* — Chamberlain Hrdlicka

(57) ABSTRACT

The disclosure describes a constant velocity joint assembly for use in transmitting torque. The constant velocity joint assembly includes members that are connected in series via tongue-and-groove connections in a swivel joint pattern that allows for transferring torque between two skew lines, and further provide freedom of movement such that rotation about one longitudinal axis can be transformed into rotation about another longitudinal axis that is not aligned with the first longitudinal axis. Thus, the members of the constant velocity joint assembly do not necessarily need to share a common longitudinal axis.

12 Claims, 7 Drawing Sheets

(51) Int. Cl.
*E21B 4/02* (2006.01)
*E21B 7/04* (2006.01)
*F16C 1/04* (2006.01)

(52) U.S. Cl.
CPC ............ *F16C 1/04* (2013.01); *F16C 2226/76* (2013.01); *F16C 2352/00* (2013.01)

(58) Field of Classification Search
CPC ... F16D 3/46; E21B 17/05; E21B 7/04; E21B 4/02
USPC .................................................. 464/150, 151
See application file for complete search history.

(56) References Cited

U.S. PATENT DOCUMENTS

| | | | |
|---|---|---|---|
| 1,595,942 A * | 8/1926 | Jacobs | ...................... F16D 3/34 |
| | | | 464/150 |
| 2,680,358 A | 6/1954 | Zublin | |
| 3,927,899 A * | 12/1975 | Bough | ................... B62D 1/163 |
| | | | 180/89.14 |
| 4,582,281 A * | 4/1986 | Van Camp | ................. B25J 9/06 |
| | | | 248/49 |
| 4,968,287 A | 11/1990 | Jacob | |
| 5,148,877 A | 9/1992 | MacGregor | |
| 5,267,905 A | 12/1993 | Wenzel et al. | |
| 6,059,664 A * | 5/2000 | Mazak | ...................... F16D 3/46 |
| | | | 464/148 |
| 6,152,826 A | 11/2000 | Profeta et al. | |
| 6,203,435 B1 | 3/2001 | Falgout, Sr. | |
| 7,186,182 B2 | 3/2007 | Wenzel et al. | |
| 7,624,819 B1 | 12/2009 | LeBlanc et al. | |
| 8,033,917 B2 | 10/2011 | Prill et al. | |
| 2003/0234106 A1 | 12/2003 | Surjaatmadja | |
| 2006/0153720 A1 | 7/2006 | Hauge | |
| 2009/0223666 A1 | 9/2009 | Robichaux et al. | |
| 2011/0272164 A1 | 11/2011 | Surjaatmadja | |

FOREIGN PATENT DOCUMENTS

| | | | |
|---|---|---|---|
| FR | 432133 A | 11/1911 | |
| GB | 408660 A | 4/1934 | |
| KR | 102013012159 A | 11/2013 | |
| SU | 724652 A1 | 3/1980 | |
| SU | 1712578 A1 | 2/1992 | |
| WO | WO-2014022765 A1 * | 2/2014 | ............. E21B 17/02 |
| WO | WO-2016/108839 A1 | 7/2016 | |

OTHER PUBLICATIONS

"International Application Serial No. PCT/US2014/072737, Written Opinion dated Sep. 17, 2015", 5 pgs.

\* cited by examiner

CONSTANT VELOCITY JOINT APPARATUS, SYSTEMS, AND METHODS

PRIORITY APPLICATION

This application is a U.S. National Stage Filing under 35 U.S.C. § 371 from International Application No. PCT/US2014/072737, filed 30 Dec. 2014; which application is incorporated herein by reference in its entirety.

BACKGROUND

The present disclosure relates generally to equipment utilized and operations performed in relation to downhole drilling systems.

Downhole drilling motors have been used for many years in the drilling of oil and gas wells and other wells. In a usual mode of operation, the rotational power output shaft of the motor and the drill bit will rotate with respect to the housing of the motor. Many downhole drilling motors have typically been powered by an elongated, helically shaped rotor housed within a helically-shaped stator. The rotors and stators create eccentric rotation that is typically transferred by means of a joint or misaligned rotating shafts, which transfers power across a bearing assembly to rotate a drill bit. Current implementations are limited in the amount of torque they can deliver downhole.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

Figure 1:
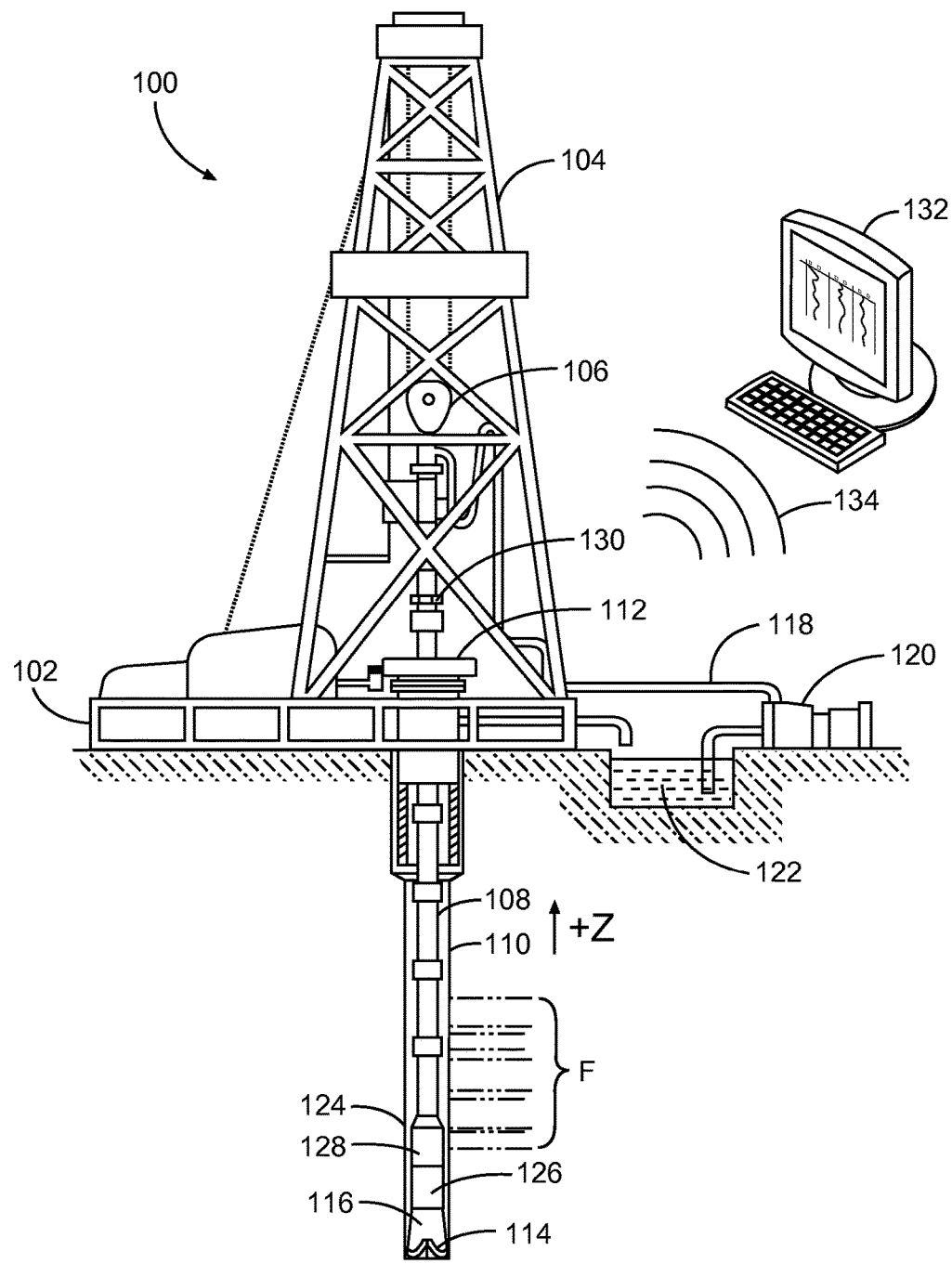
FIG. 1 is a diagram of an example drilling system, according to various embodiments of the invention.

This disclosure describes a mechanism for use in transmitting torque between a downhole motor assembly and a drill bit. The disclosed tools and methods are best understood in the context of the larger systems in which they operate. Accordingly, FIG. 1 illustrates an example drilling system 100, according to various embodiments of the invention. A drilling rig or platform 102 supports a derrick 104 or other supporting structure, such as including or coupled to a hoist 106. The hoist 106 is used for raising or lowering equipment or other apparatus such as drill string 108. The drill string 108 accesses a borehole 110, also known as a wellbore, such as through a wellhead 112. The lower end of the drill string 108 includes various apparatus, such as a drill head 114, to provide the borehole 110. A downhole motor assembly 116 rotates the drill head 114. As the drill head 114 rotates, it extends the borehole 110 that passes through various subsurface formations F. The downhole motor assembly 116 may include a rotary steerable system (RSS) that enables a drilling crew to steer the borehole 110 along a desired path.

Drilling fluid or "mud" circulates in the annular region around the drill head 114 or elsewhere, such as provided to the borehole 110 through a supply pipe 118, circulated by a pump 120, and returning to the surface to be captured in a retention pit 122 or sump. The drilling fluid transports cuttings from the borehole into the retention pit 122 and aids in maintaining the borehole integrity.

The drill head 114 and downhole motor assembly 116 form a portion of a bottom hole assembly (BHA) 124 that includes one or more drill collars (thick-walled steel pipe) to provide weight and rigidity to aid the drilling process. Various subs or tool assemblies may also be located along the drill string 108 and/or in the BHA 124. For example, the BHA 124 may include a resistivity logging tool 126 that collects measurements relating to various formation properties as well as the tool orientation and/or other drilling conditions. As the BHA 124 passes through various regions of the formation F, information may be obtained.

A telemetry sub 128 is included in the bottomhole assembly 124 to provide a communications link with the surface. The telemetry sub 128 includes wireless telemetry or logging capabilities, or both, such as to transmit or later provide information relating to multicomponent induction data to operators on the surface or for later access in evaluation of formation F properties. Mud pulse telemetry is one common telemetry technique for transferring tool measurements to a surface interface 130 and to receive commands from the surface interface 130, but other telemetry techniques can also be used. For example, the surface interface 130 includes one or more of wireless telemetry, processor circuitry, or memory facilities, such as to support log-while-drilling (LWD) or measurement-while-drilling (MWD) operations.

A surface processor, shown in FIG. 1 in the form of a computer 132, communicates with surface interface 130 via a wired or wireless network communications link 134, and provides a graphical user interface (GUI) or other form of interface that enables a user to provide commands and to receive and optionally interact with a visual representation of the acquired measurements. The surface processor can take alternative forms, including a desktop computer, a laptop computer, an embedded processor, a cloud computer, a central processing center accessible via the internet, and any combination of the foregoing. In many examples, the surface processor will include one or more processors in combination with additional hardware as needed (volatile and/or non-volatile memory; communication ports; I/O device(s) and ports; etc.) to provide the formation dip and azimuth determinations as described herein.

An example surface processor can serve to control the functions of the drilling system 100 and to receive and process downhole measurements transmitted from the telemetry sub 128 to control drilling parameters. In such examples, one or more a non-volatile, machine-readable storage devices (i.e., a memory device (such as DRAM, FLASH, SRAM, or any other form of storage device; which in all cases shall be considered a non-transitory storage medium), a hard drive, or other mechanical, electronic, magnetic, or optical storage mechanism, etc.) will contain instructions suitable to cause the processor to describe the desired functionality, such as the various examples discussed herein). The surface processor operates in accordance with software (which may be stored on non-volatile, machine-readable storage devices) and user input via an input device to process and decode the received signals. The resulting telemetry data may be further analyzed and processed by the surface processor to generate a display of useful information on a computer monitor or some other form of a display device. Of course, these functions may be implemented by separate processing units, as desired, and additional functions may be performed by such one or more processing units in response to similarly stored instructions.

For purposes of illustration, the example of FIG. 1 shows a vertically-oriented borehole configuration. However, the tools and methods described herein may also be used in other borehole configurations, such as a borehole including a horizontal penetration direction, or an oblique borehole configuration, for example. The borehole 110 may be drilled in any direction, for example, vertical, inclined, horizontal, and combinations thereof. The example of FIG. 1 generally illustrates a land-based example. Alternatively, the apparatus and techniques described herein may be used in offshore environments as well, such as for subsea operations.

Figure 2:
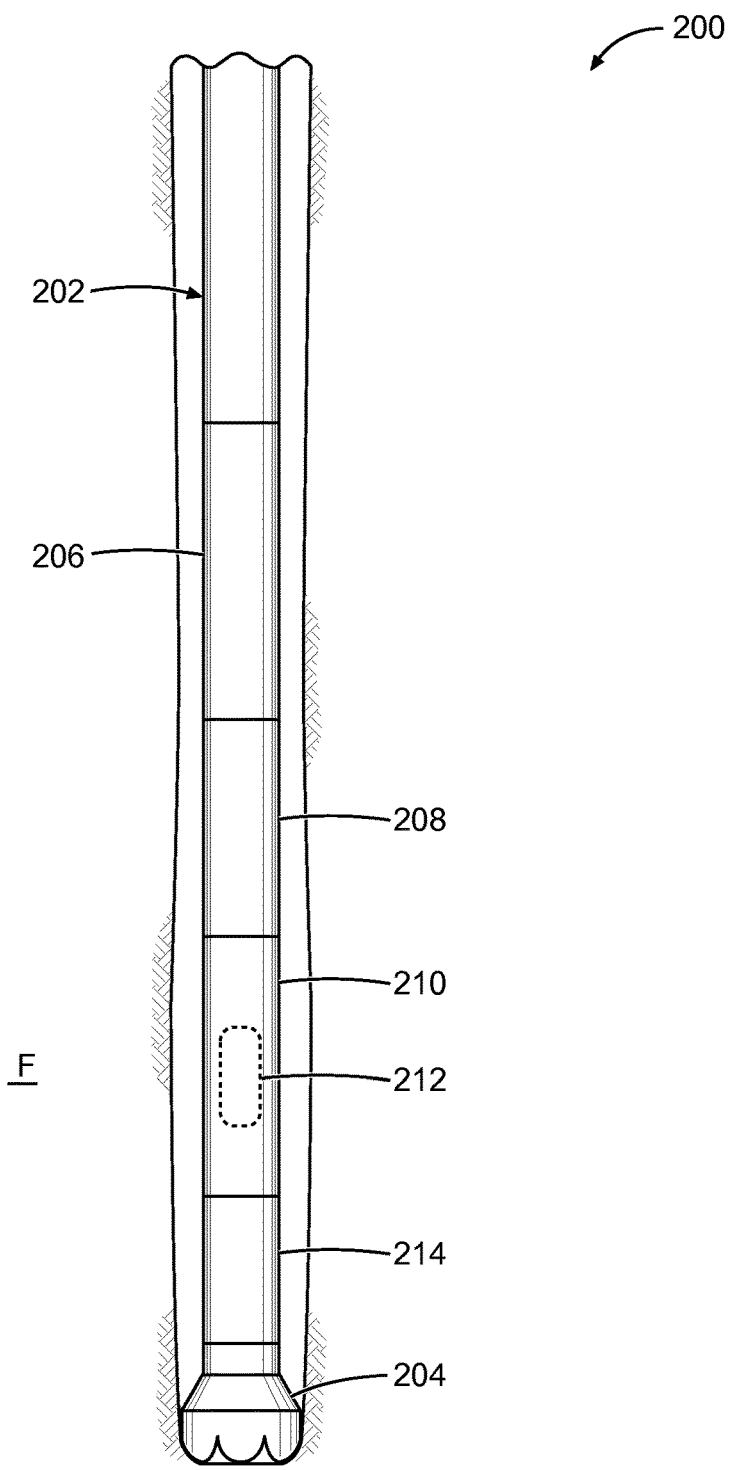
FIG. 2 is a perspective view of an example downhole motor assembly, according to various embodiments of the invention.

FIG. 2 is a diagram illustrating a perspective view of an example downhole motor assembly 200. The downhole motor assembly 200 is incorporated into the drill string 202 above the drill head 204, and provides for rotation of the drill head 204 at an end of the drill string 202. The downhole motor assembly 200 includes a top sub 206 that connects the downhole motor assembly 200 to the drill string 202. A power section 208, which consists of a rotor (not shown) and a stator (not shown), is coupled to the top sub 206. During operation of the downhole motor assembly 200, drilling fluid is forced through the power section 208, causing the rotor to rotate within the stator. As the drill head 204 engages the formation F for drilling, torque is then required to turn the drill head 204 against the formation F.

The rotor in the power section 208 is coupled to a drive shaft enclosed within a drive shaft assembly 210 for transmission of rotational torque from the rotor to the drive shaft for turning the drill head 204. Specifically, an output shaft of the rotor is connected to an upper end of the drive shaft by way of a joint connection 212 for transferring the rotor rotation to the drill head 204 via a bearing assembly 214. In this example, the bearing assembly 214 rotationally supports an output shaft (not shown) which transmits rotation and torque to the drill head 204 for drilling a wellbore.

The power section 208 of the downhole motor assembly 200 in this example can include a positive displacement drilling motor which produces a desired rotational speed and torque for well drilling operations. For example, the drilling motor can be similar to a SPERRYDRILL™ positive displacement drilling motor marketed by Halliburton Energy Services, Inc. of Houston, Tex. USA. However, other types of drilling motors (e.g., other positive displacement motors, turbine motors, etc.) can be used in other examples. This description applies to a positive displacement motor; however, the downhole motor assembly 200 is not limited to positive displacement drilling motors and may include, for example, turbodrills, in which the rotor motion is concentric.

In operation, the rotor rotates, or orbits, about a central longitudinal axis of a stator housing, with the rotor axis and the stator axis remaining parallel with each other. At the same time, the rotor also rotates about its own longitudinal axis. Thus, the rotary output of the rotor in positive displacement drilling motors is eccentric relative to the axis of the drill string 202 and to the drive shaft of the drive shaft assembly 210 to which the rotor is coupled. The eccentric motion of the rotor can be centerlined and converted into concentric rotation for input to the drive shaft assembly 210. Accordingly, a joint connection 212 is used to connect the output shaft of the rotor to the drive shaft of the drive shaft assembly 210, whereby rotation and torque can be transferred from the rotor to the drive shaft irrespective of the fact that the output shaft of the rotor and drive shaft axes may be non-collinear.

Figure 3:
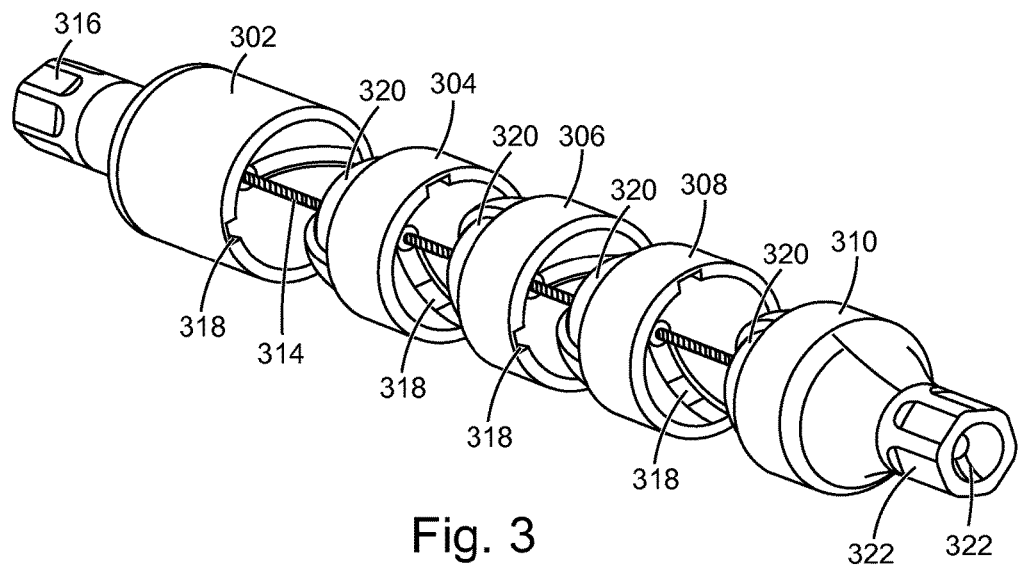
FIG. 3 is an exploded view depicting an example joint connection, according to various embodiments of the invention.

Referring now to FIG. 3, illustrated is an exploded view of an example joint connection for transmitting eccentric rotation from the rotor. In this example, the joint connection is a constant velocity joint 300 comprising five members 302, 304, 306, 308, and 310 that are connected in series. Each of the five members 302, 304, 306, 308, and 310 includes a hole 312 penetrated by the longitudinal axes of each member. In this example, a coupling element 314 traverses the holes penetrated by the longitudinal axes of the members 302, 304, 306, 308, and 310 to mechanically couple the members. It should be noted that clearance is provided for the coupling element 314 and the holes which the coupling element 314 traverses to provide freedom for the members 302, 304, 306, 308, and 310 to move easily. This clearance is dependent upon a desired maximum eccentricity between the longitudinal axes. The coupling element 314 comprises, for example, a wire, an elastic band, a coil spring, or any other mechanical mechanism for applying a compressive force between the members 302, 304, 306, 308, and 310 for connecting them together axially in compression and minimizing separation between the members 302, 304, 306, 308, and 310 in the presence of a tensile axial load. In some embodiments, an external fastener (not shown) can be used as a replacement and/or supplement to the coupling element 314 for connecting the members 302, 304, 306, 308, and 310 together. Alternatively, the coupling element 314 can be omitted from the constant velocity joint 300 if operation conditions result in a compressive force always being present between the members and the coupling element 314 is no longer needed to prevent separation between the members 302, 304, 306, 308, and 310.

Member 302 has a longitudinal axis and comprises a first end and a second end opposite the first end. The first end of the member 302 includes an outer surface connector 316 that provides a connection to a section uphole of the constant velocity joint 300. In this example, the outer surface connector 316 comprises a polygon, thread, or spline connector for transferring torque from an output shaft (not shown) of a rotor to the constant velocity joint 300. The second end of the member 302 includes a groove 318 (e.g., a generally inward indentation) that couples with intermediary member 304. The groove 318 extends substantially transversely across a half-socket shaped opening at the second end of the member 302.

Member 310 has a longitudinal axis and comprises a first end and a second end opposite the first end. The first end of the member 310 includes a tongue 320 (e.g., a generally outward protrusion) that couples with intermediary member 308. The tongue 320 extends substantially transversely across a half-ball shaped protrusion at the first end of the member 310. The second end of the member 310 includes an outer surface connector 322 that provides a connection to a section downhole of the constant velocity joint 300. In this example, the outer surface connector 322 comprises a polygon, thread, or spline connector for transferring torque from the constant velocity joint 300 to a drive shaft (not shown) of a drive shaft assembly.

Although the example of FIG. 3 describes the constant velocity joint 300 as being oriented with outer surface connector 316 providing a connection to a section uphole of the constant velocity joint 300 and outer surface connector 322 providing a connection to a section downhole of the constant velocity joint 300, it is noted that the directionalities are interchangeable. In some embodiments, the outer surface connector 316 provides a connection to a section downhole of the constant velocity joint 300 and the outer surface connector 322 provides connection to a section uphole of the constant velocity joint 300, such as a motor or other tool component.

Figures 4A, 4B:
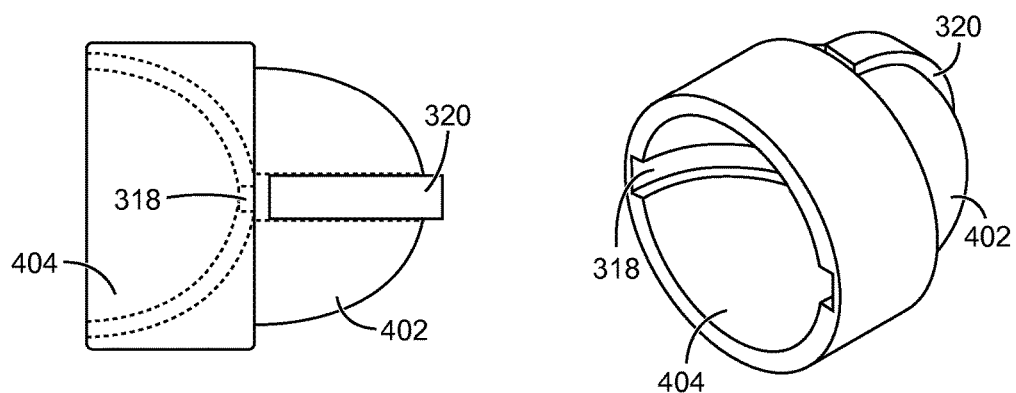
FIGS. 4A-4B are diagrams illustrating illustrate a side elevational view and a perspective view of an intermediary member, according to various embodiments of the invention.

Each of the intermediary members 304, 306, and 308 includes a tongue 320 (e.g., a generally outward protrusion) at a first end and a groove 318 (e.g., a generally inward indentation) at a second end of the intermediary members. Referring additionally now to FIGS. 4A-4B with continued reference to FIG. 3, an example intermediary member (e.g., one of the intermediary members 304, 306, and 308) is representatively illustrated apart from the remainder of the constant velocity joint 300. FIGS. 4A-4B illustrate a side elevational view and a perspective view of an intermediary member, respectively.

The tongue 320 extends substantially transversely across a half-ball shaped protrusion 402 at a first end of the intermediary member. The groove 318 extends substantially transversely across a half-socket shaped opening 404 at the second end of the intermediary member. It is noted that the tongue 320 at the first end and the groove 318 at the second are oriented out of alignment with each other within each intermediary member. In this example, the tongue 320 and the groove 318 are offset ninety-degrees rotationally from each other. In other examples, the tongue 320 and the groove 318 do not necessarily need to be arranged perpendicularly to each other, but can be offset from each other by any number of degrees.

The tongues 320 and the grooves 318 of members 302, 304, 306, 308, and 310 engage each other via the half-socket shaped openings and the half-ball shaped protrusions of their respective adjacent members in a swivel joint pattern. Thus, the five members 302, 304, 306, 308, and 310 being connected in series comprises four swivel joints, which couples the members together while providing a degree of freedom of movement for allowing the members to move relative to each other. For example, the half-ball shaped protrusion of intermediary member 304 fits within the half-socket shaped opening of member 302 such that the tongue 320 engages the groove 318. While coupled together, rotation and torque can be transferred from member 302 to intermediary member 304 via the tongue 320 and groove 318 connection while the member 302 rotates around its longitudinal axis. At the same time, the tongue 320 can articulate along groove 318. Thus, intermediary member 304 does not necessarily need to share a common longitudinal axis with member 302. In this way, the swivel joints provide integrated tongue and groove connections for carrying torque, and further provide freedom of movement such that rotation about one longitudinal axis can be transformed into rotation about another longitudinal axis that is not aligned with the first longitudinal axis.

Figure 5A:
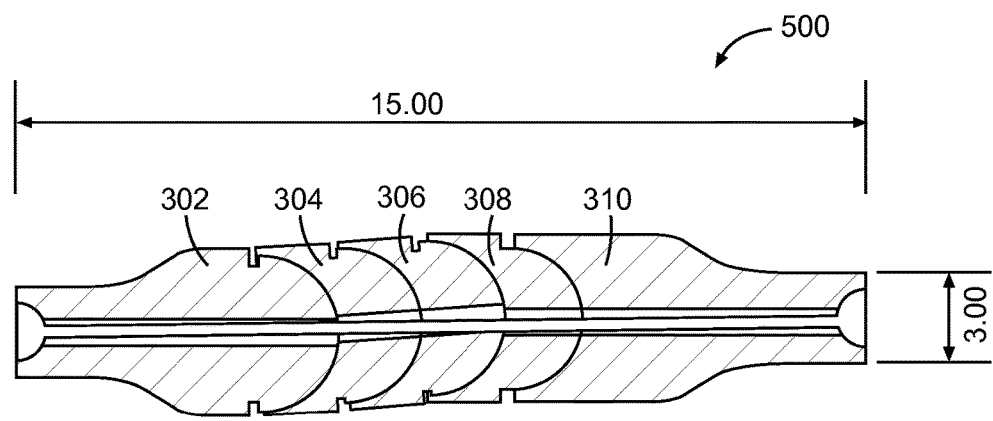
FIGS. 5A-5B are diagrams illustrating a side cross sectional view and a side elevational view of an assembled constant velocity joint, according to various embodiments of the invention.
Figure 5B:
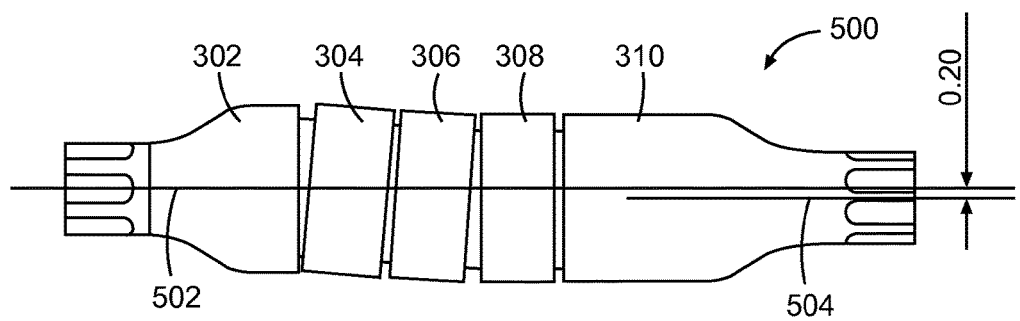

Referring additionally now to FIGS. 5A-5B, an assembled constant velocity joint is illustrated. FIGS. 5A-5B show a side cross sectional view and a side elevational view of an assembled constant velocity joint 500, respectively. It is noted that the members 302, 304, 306, 308, and 310 of the assembled constant velocity joint 500 are not all aligned along the same centerline. For example, the longitudinal axis 502 of member 302 is offset from the longitudinal axis 504 of member 310. In this example, there is an eccentricity of 0.2 inches between members 302 and 310 within the assembled constant velocity joint 500. Eccentricity refers to the degree to which the members fail to share a common longitudinal axis. The degree of eccentricity can be expressed as a difference between the input longitudinal axis at member 302 and the output longitudinal axis at member 310. Although the example of FIGS. 5A-5B show an eccentricity of about 0.2 inches, the transferring of torque between joints with higher and lower eccentricities is feasible.

By allowing for an eccentricity between the axes, constant velocity joint 500 is capable of taking a s-bend shape and transferring torque between two skew lines. In other words, the transmitting axes (e.g., longitudinal axes of members 302 and 310) do not necessarily need to lie in a common plane or intersect. In operation, one member (e.g., member 310) couples to a downhole sub and can be rotatable about a fixed rotation axis, such as associated with a drill head. The other member (e.g., member 302) connects to the rotor in the power section and is rotatable in a circular path about the fixed rotation axis. Thus, eccentric motion in the power section of the downhole motor assembly, provided as input to the member 302, can be transferred as concentric power to the drill head by way of member 310.

The constant velocity joint as described in this disclosure can have a shorter length relative to other joint connections as known in the art. In the example of FIGS. 5A-5B, the constant velocity joint 500 has an outer diameter (OD) of 3 inches and a length of 15 inches. The torque rate capacity of such an example constant velocity joint 500 with an OD of 3 inches and a length of 15 inches is approximately 6000 ft-lb. The torque rate capacity can be altered by altering the sizing of the tongue 320 and the groove 318. For example, using a larger tongue and groove generally increases the torque rate capacity, while a smaller tongue and groove generally decreases the torque rate capacity.

Figure 6:
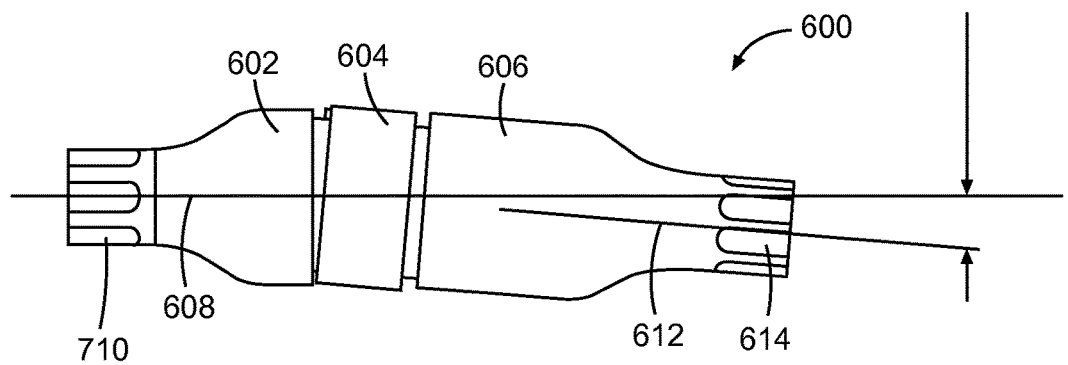
FIG. 6 is a side elevational view of a joint connection with one intermediary member, according to various embodiments of the invention.

In the examples of FIG. 3-FIG. 5B, the constant velocity joint includes three intermediary members 304, 306, and 308 positioned between members 302 and 310, but other numbers of these intermediary members can be used in other examples. In an alternative embodiment, FIG. 6 illustrates a side elevational view of a joint connection with one intermediary member. Joint connection 600 comprises three members 602, 604, and 606 that are connected in series. Each of the three members 602, 604, and 606 includes a hole (not shown) penetrated by the longitudinal axes of each member. A coupling element traverses the holes penetrated by the longitudinal axes of the members 602, 604, and 606 to mechanically couple the members. It should be noted that clearance is provided for the coupling element and the holes which the coupling element traverses to provide freedom for the members 602, 604, and 606 to move easily. This clearance is dependent upon a desired maximum eccentricity between the longitudinal axes. The coupling element comprises, for example, a wire, an elastic band, a coil spring, or any other mechanical mechanism for applying a compressive force between the members 602, 604, and 606 for connecting them together axially in compression and minimizing separation between the members 602, 604, and 606 in the presence of a tensile axial load.

Member 602 has a longitudinal axis 608 and comprises a first end and a second end opposite the first end. The first end of the member 602 includes an outer surface connector 610 that provides a connection to a section uphole of the joint connection 600. In this example, the outer surface connector 610 comprises a polygon, thread, or spline connector for transferring torque from an output shaft (not shown) of a rotor to the joint connection 600. The second end of the member 602 includes a groove (e.g., a generally inward indentation) that couples with intermediary member 604. The groove extends substantially transversely across a half-socket shaped opening at the second end of the member 602.

Member 606 has a longitudinal axis 612 and comprises a first end and a second end opposite the first end. The first end of the member 606 includes a tongue (e.g., a generally outward protrusion) that couples with intermediary member 604. The tongue extends substantially transversely across a half-ball shaped protrusion at the first end of the member 606. The second end of the member 606 includes an outer surface connector 614 that provides a connection to a section downhole of the joint connection 600. In this example, the outer surface connector 614 comprises a polygon, thread, or spline connector for transferring torque from the joint connection 600 to a drive shaft (not shown) of a drive shaft assembly.

Although the example of FIG. 6 describes the joint connection 600 as being oriented with outer surface connector 610 providing a connection to a section uphole of the joint connection 600 and outer surface connector 614 providing a connection to a section downhole of the joint connection 600, it is noted that the directionalities are interchangeable. In an alternative embodiment, the outer surface connector 610 provides a a connection to a section down hole of the joint connection 600 and the outer surface connector 614 provides connection to a section uphole of the joint connection 600, such as a motor or other tool component.

Similar to the intermediary members described above in reference to FIG. 4, the intermediary member 604 includes a tongue (e.g., a generally outward protrusion) at a first end and a groove (e.g., a generally inward indentation) at a second end of the intermediary member 604. The three members 602, 604, and 606 being connected in series comprises two swivel joints, which couples the members together while providing a degree of freedom of movement for allowing the members to move relative to each other. The configuration of joint connection 600, with its two swivel joints, allows for two degrees of freedom of movement in three-dimensional space. It is noted that the members 602, 604, and 606 of the joint connection 600 are not all aligned along the same centerline. For example, the longitudinal axis 608 of member 602 is offset from the longitudinal axis 612 of member 606.

In an alternative embodiment, both members 602 and 606 have a first end including a tongue (e.g., a generally outward protrusion) that couples with intermediary member 604 and a second end including an outer surface connector. In this example, both a first end and a second end of the intermediary member 604 includes a groove (e.g., a generally inward indentation) that couples with the tongue of members 602 and 606.

In another alternative embodiment, both members 602 and 606 have a first end including a groove (e.g., a generally inward indentation) that couples with intermediary member 604 and a second end including an outer surface connector. In this example, both a first end and a second end of the intermediary member 602 includes a tongue (e.g., a generally outward protrusion) that couples with the grooves of members 602 and 606.

Figure 7:
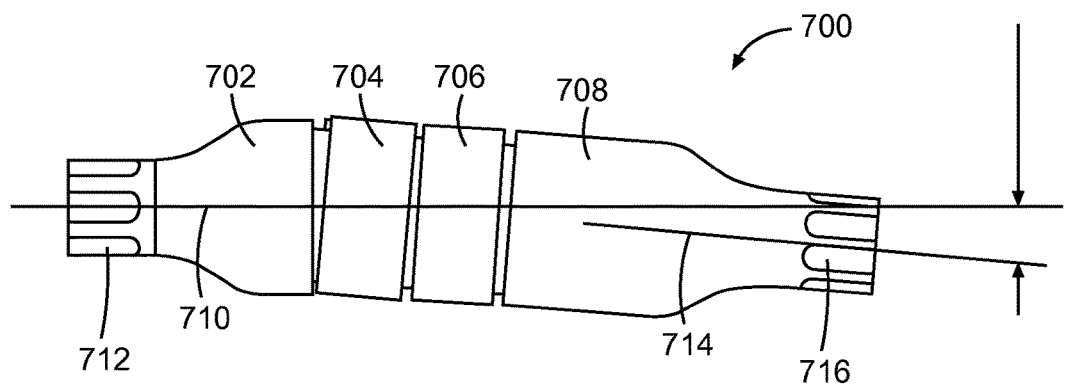
FIG. 7 is a side elevational view of a joint connection with two intermediary members, according to various embodiments of the invention.

FIG. 7 illustrates a side elevational view of a joint connection with two intermediary members. Joint connection 700 comprises four members 702, 704, 706, and 708 that are connected in series. Each of the four members 702, 704, 706, and 708 includes a hole (not shown) penetrated by the longitudinal axes of each member. A coupling element traverses the holes penetrated by the longitudinal axes of the members 702, 704, 706, and 708 to mechanically couple the members. It should be noted that clearance is provided for the coupling element and the holes which the coupling element traverses to provide freedom for the members 702, 704, 706, and 708 to move easily. This clearance is dependent upon a desired maximum eccentricity between the longitudinal axes. The coupling element comprises, for example, a wire, an elastic band, a coil spring, or any other mechanical mechanism for applying a compressive force between the members 702, 704, 706, and 708 for connecting them together axially in compression and minimizing separation between the members 702, 704, 706, and 708 in the presence of a tensile axial load.

Member 702 has a longitudinal axis 710 and comprises a first end and a second end opposite the first end. The first end of the member 710 includes an outer surface connector 712 that provides a connection to a section uphole of the joint connection 700. In this example, the outer surface connector 712 comprises a polygon, thread, or spline connector for transferring torque from an output shaft (not shown) of a rotor to the joint connection 700. The second end of the member 702 includes a groove (e.g., a generally inward indentation) that couples with intermediary member 704. The groove extends substantially transversely across a half-socket shaped opening at the second end of the member 702.

Member 708 has a longitudinal axis 714 and comprises a first end and a second end opposite the first end. The first end of the member 708 includes a tongue (e.g., a generally outward protrusion) that couples with intermediary member 706. The tongue extends substantially transversely across a half-ball shaped protrusion at the first end of the member 708. The second end of the member 708 includes an outer surface connector 716 that provides a connection to a section downhole of the joint connection 700. In this example, the outer surface connector 716 comprises a polygon, thread, or spline connector for transferring torque from the joint connection 700 to a drive shaft (not shown) of a drive shaft assembly.

Although the example of FIG. 7 describes the joint connection 700 as being oriented with outer surface connector 712 providing a connection to a section uphole of the joint connection 700 and outer surface connector 716 providing a connection to a section downhole of the joint connection 700, it is noted that the directionalities are interchangeable. In an alternative embodiment, the outer surface connector 712 provides a connection to a section down hole of the joint connection 700 and the outer surface connector 716 provides connection to a section uphole of the joint connection 700, such as a motor or other tool component.

Similar to the intermediary members described above in reference to FIG. 4, each of the intermediary members 704 and 706 includes a tongue (e.g., a generally outward protrusion) at a first end and a groove (e.g., a generally inward indentation) at a second end of the intermediary member 704 and 706. The four members 702, 704, 706, and 708 being connected in series comprises three swivel joints, which couples the members together while providing a degree of freedom of movement for allowing the members to move relative to each other. The configuration of joint connection 700, with its three swivel joints, allows for three degrees of freedom of movement in three-dimensional space. It is noted that the members 702, 704, 706, and 708 of the joint connection 700 are not all aligned along the same centerline. For example, the longitudinal axis 710 of member 702 is offset from the longitudinal axis 714 of member 708.

Figure 8:
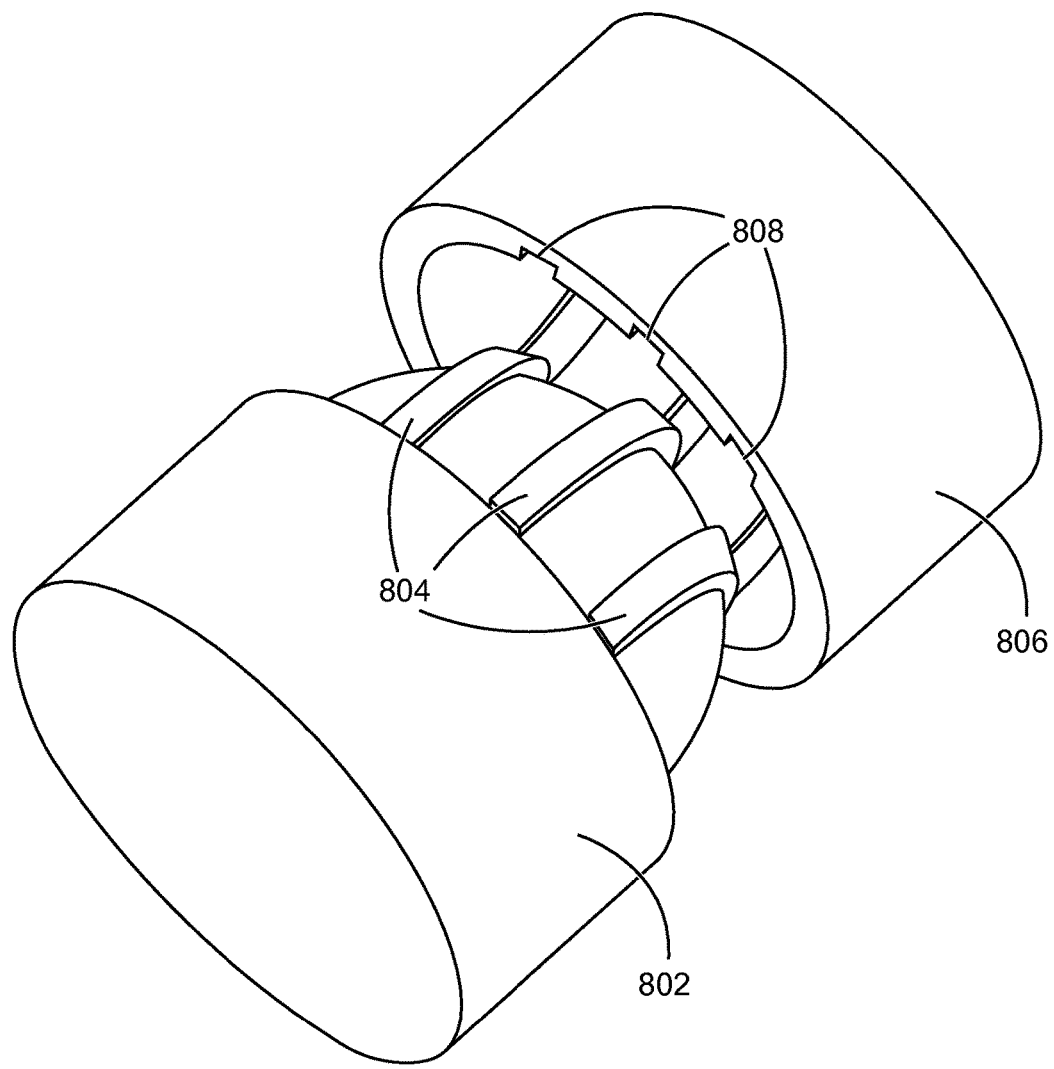
FIG. 8 is a perspective view of a joint connection having three tongues and grooves for each member, according to various embodiments of the invention.

Although the embodiment in FIGS. 3-7 include one tongue and groove for each member, other embodiments can include multiple sets of tongues and grooves. For example, FIG. 8 is a perspective view showing a configuration for a joint connection having three tongues and grooves for each member. In this view, it can be seen that a first end of the member 802 includes three tongues 804 (e.g., generally outward protrusions) that couples with an adjacent member 806. The tongues 804 extend substantially transversely across a half-ball shaped protrusion at the first end of the member 802. The member 806 includes three grooves 808 (e.g., generally inward indentations) that couples with member 802. The grooves 808 extend extends substantially transversely across a half-socket shaped opening at an end of the member 806. This increase in the number of tongues and grooves increases the mating area between members and increases the torque capacity of the joint connection.

Figure 9:
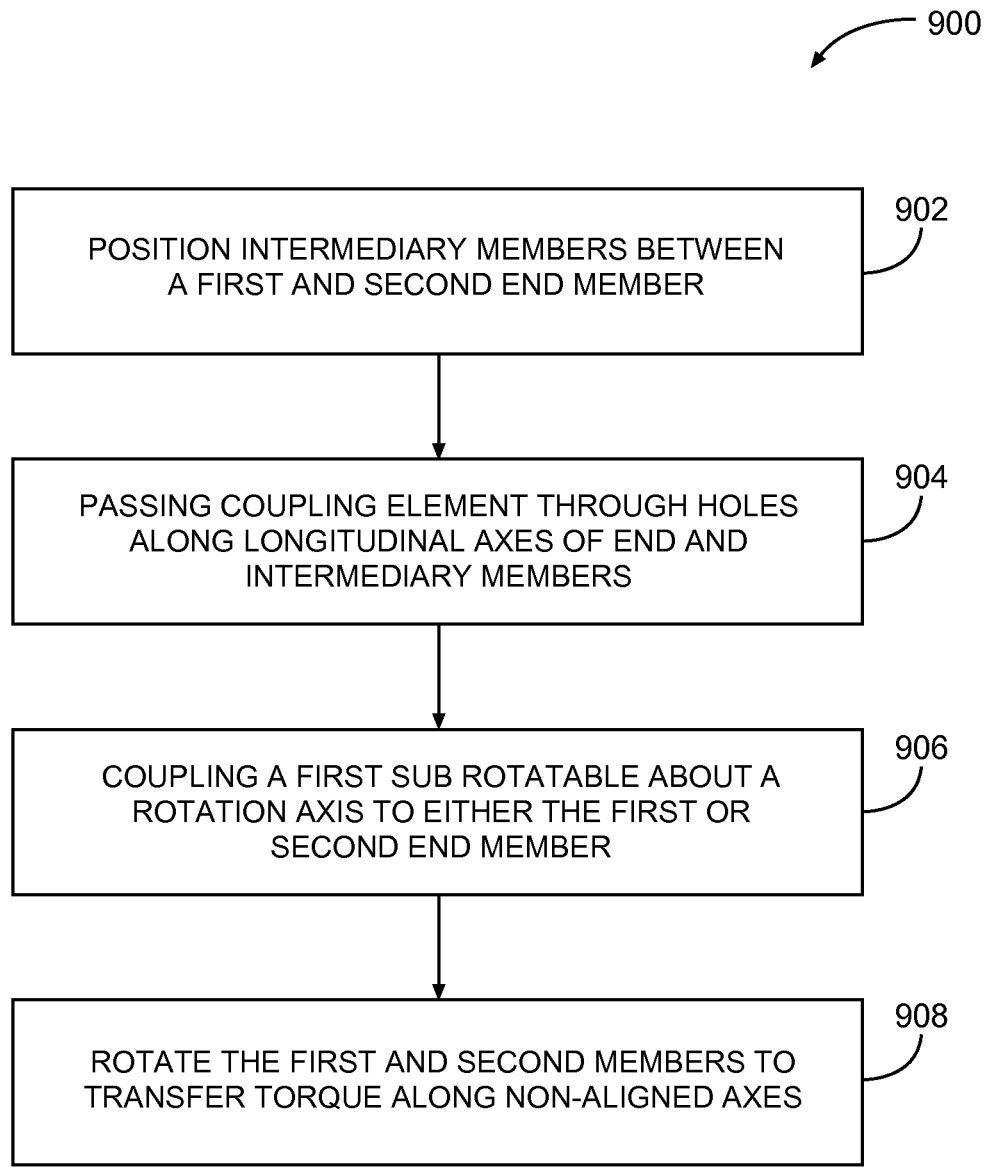
FIG. 9 is a flow diagram illustrating some methods of joint assembly, according to various embodiments of the invention.

FIG. 9 is a flow diagram illustrating some methods of joint assembly, according to various embodiments of the invention. Many embodiments may be realized, for example, a method 900 may begin at block 902 with positioning intermediary members between a first and second end member. For example, the first end member comprises a groove in a first end and a hole penetrated by a longitudinal axis of the first end member. The second end member comprises a tongue in a first end and also includes a hole penetrated by a longitudinal axis of the second end member. Each of the intermediary members comprises a groove in a first end and a tongue in a second end that is oriented substantially perpendicular to each other, and also includes a hole penetrated by a longitudinal axis of each respective intermediary member.

At block 902, the first end member is coupled to the second end member by passing a coupling element through holes along the longitudinal axes of the members. A compressive force can be applied using the coupling element to reduce separation between the first end member, the second end member, and the intermediary members in the presence of a tensile load distributed along the longitudinal axis of at least one of the first, second, or intermediary members. In an alternative embodiment, a third intermediary member can be positioned between the first and second end members prior to coupling the first and second end members using the coupling element. Similar to the other intermediary members, the third intermediary member comprises a groove in a first end and a tongue in a second end that is oriented substantially perpendicular to each other, and also includes a hole penetrated by a longitudinal axis of each respective intermediary member.

At block 906, a first sub rotatable about a rotation axis for transmitting torque to a second sub rotatable in a circular path about the rotation axis is coupled to a second end of either the first or the second member for rotation therewith. For example, one end member is coupled to a downhole sub and can be rotatable about a fixed rotation axis, such as associated with a drill head. The other member connects to the rotor in the power section and is rotatable in a circular path about the fixed rotation axis. Thus, eccentric motion in the power section of the downhole motor assembly, provided as input to one member, can be transferred as concentric power to the drill head by way of the other member. At block 908, the first and second members can be rotated to transfer torque along non-aligned longitudinal axes.

As described in the present disclosure, the constant velocity joints can be embodied as an apparatus with a first member having a groove in a first end of the first member and a hole penetrated by a longitudinal axis of the first member, a second member having a tongue in a first end of the second member and a hole penetrated by a longitudinal axis of the second member, and two intermediary members positioned between the first and second members. Each intermediary member comprises a groove in a first end and a tongue in a second end of the intermediary members, wherein each intermediary member includes a hole penetrated by a longitudinal axis of each intermediary member. The groove in the first end and the tongue in the second end of each intermediary member are oriented out of alignment with each other. The apparatus includes a coupling element to mechanically couple the first and the second members, wherein the coupling element traverses the holes penetrated by the longitudinal axes of the first member, the second member, and the intermediary members. In some embodiments, the apparatus includes a third intermediary member positioned between the first and second members, the third intermediary member having a groove in a first end and a tongue in a second end. The third intermediary member includes a hole penetrated by a longitudinal axis of the third intermediary member. The groove in the first end and the tongue in the second end of the third intermediary member are oriented substantially perpendicular to each other.

The grooves of the first member and the intermediary members can extend substantially transversely across a recess in the first end of the first member and the intermediary members. In a similar manner, the tongue of the second member extends substantially transversely across a protrusion in the first end of the second member, and wherein the tongues of the two intermediary members extend substantially transversely across a protrusion in the second ends of the two intermediary members. The grooves in the first end of the first member or second engages with the tongue in the second end of one of the intermediary members in a swivel joint pattern. The grooves in the first end of one of the intermediary members also engages with the tongue in the second end of another one of the intermediary members. In this way, the second end of at least one of the first and second members provides a connection to a downhole motor for transferring torque from the motor to the apparatus.

In another embodiment, the constant velocity joint can also be embodied as an apparatus for transmitting torque that includes a first member having a groove in a first end of the first member and a hole penetrated by a longitudinal axis of the first member, a second member having a tongue in a first end of the second member and a hole penetrated by a longitudinal axis of the second member, and two intermediary members positioned between the first and second members. Each intermediary member has a groove in a first end and a tongue in a second end of the intermediary member, and further includes a hole penetrated by a longitudinal axis of each intermediary member. The groove in the first end and the tongue in the second end of each intermediary member are oriented substantially perpendicular to each other. The apparatus also includes a first sub rotatable about a rotation axis for transmitting torque from a second sub rotatable in a circular path about the axis, wherein a second end of either the first or the second member couples to the first sub for rotation therewith. In some embodiments, the apparatus includes a third intermediary member positioned between the first and second members, the third intermediary member having a groove in a first end and a tongue in a second end. The third intermediary member includes a hole penetrated by a longitudinal axis of the third intermediary member. The groove in the first end and the tongue in the second end of the third intermediary member are oriented substantially perpendicular to each other.

A coupling element mechanically couples the first and the second members, wherein the coupling element traverses the holes along the longitudinal axes of the first member, the second member, and the intermediary members. The coupling element comprises a wire to apply a compressive force between the first and second members. A clearance is provided between the coupling element and the holes which the coupling element traverses that is based at least in part on a desired maximum eccentricity of axes.

The second end of either the first or the second member provides a connection to a downhole motor for transferring torque from the motor to the apparatus. The connection comprises a polygon, thread, or spline connection. In this way, when the tongues and grooves of the members and intermediary members engage each other in a swivel joint pattern, torque can be transferred from the motor to the apparatus.

In summary, the constant velocity joints described herein will provide greater torque downhole than is available with conventional joint assemblies. Greater reliability, operational speed, and thus, customer satisfaction, may be achieved as a result.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A constant velocity joint comprising:
  a first member comprising an outer surface connector to receive torque through, a plurality of grooves extending transversely across a recess in a first end of the first member, and a hole penetrated by a longitudinal axis of the first member;
  a second member comprising an outer surface connector to transmit torque through, a plurality of tongues extending transversely across a portion of a protrusion in a first end of the second member, and a hole penetrated by a longitudinal axis of the second member;
  two intermediary members positioned between the first and second members to transfer torque from the first member, through the two intermediary members, and to the second member, each intermediary member comprising a plurality of grooves extend transversely across a recess in a first end and a plurality of tongues extending transversely across a portion of a protrusion in a second end of the intermediary members, wherein each intermediary member includes a hole penetrated by a longitudinal axis of each intermediary member, and wherein the plurality of grooves in the first end and the plurality of tongues in the second end of each intermediary member are oriented perpendicularly with each other, wherein the plurality of grooves in the first end of a first of the two intermediary members engages with the plurality of tongues in the second end of a second of the two intermediary members to transfer torque therethrough, wherein; and
  a coupling element to mechanically couple the first and the second members, wherein the coupling element traverses the holes penetrated by the longitudinal axes of the first member, the second member, and the intermediary members, to apply a compressive force between the first and second members, wherein the first member rotates about the longitudinal axis of the first member and the second member rotates about the longitudinal axis of the second member during the transfer of torque between the first member and the second member.

2. The constant velocity joint of claim 1, further comprising:
a third intermediary member positioned between the first and second members, the third intermediary member comprising a plurality of grooves in a first end and a plurality of tongues in a second end, wherein the third intermediary member includes a hole penetrated by a longitudinal axis of the third intermediary member, and wherein the plurality of grooves in the first end and the plurality of tongues in the second end of the third intermediary member are oriented perpendicular to each other.

3. The constant velocity joint of claim 1, wherein a second end of at least one of the first and second members provides a connection to a downhole motor for transferring torque from the motor to the apparatus.

4. An apparatus for use in transmitting torque, comprising:
a constant velocity joint comprising:
a first member comprising an outer surface connector to receive torque through, a plurality of grooves extending transversely across a recess in a first end of the first member, and a hole penetrated by a longitudinal axis of the first member;
a second member comprising an outer surface connector to transmit torque through, a plurality of tongues extending transversely across a portion of a protrusion in a first end of the second member, and a hole penetrated by a longitudinal axis of the second member;
two intermediary members positioned between the first and second members to transfer torque from the first member, through the two intermediary members, and to the second member, each intermediary member comprising a plurality of grooves extend transversely across a recess in a first end and a plurality of tongues extending transversely across a portion of a protrusion in a second end of the intermediary members, wherein each intermediary member includes a hole penetrated by a longitudinal axis of each intermediary member, and wherein the plurality of grooves in the first end and the plurality of tongues in the second end of each intermediary member are oriented perpendicular to each other and wherein the plurality of grooves in the first end of a first of the two intermediary members engages with the plurality of tongues in the second end of a second of the two intermediary members to transfer torque therethrough, wherein;
a coupling element to mechanically couple the first and the second members, wherein the coupling element traverses the holes along the longitudinal axes of the first member, the second member, and the intermediary members, to apply a compressive force between the first and second members, wherein the first member rotates about the longitudinal axis of the first member and the second member rotates about the longitudinal axis of the second member during the transfer of torque between the first member and the second member; and
a first sub rotatable about a rotation axis for transmitting torque from a second sub rotatable in a circular path about the axis, wherein a second end of either the first or the second member couples to the first sub for rotation therewith.

5. The apparatus of claim 4, further comprising:
a third intermediary member positioned between the first and second members, comprising a plurality of grooves in a first end and a plurality of tongues in a second end of the third intermediary member, wherein the third intermediary member includes a hole penetrated by a longitudinal axis of the third intermediary member, and wherein the plurality of grooves in the first end and the plurality of tongues in the second end of the third intermediary member are oriented perpendicular to each other.

6. The apparatus of claim 4, wherein a clearance is provided between the coupling element and the holes which the coupling element traverses.

7. The apparatus of claim 4, wherein the clearance is based at least in part on a desired maximum eccentricity of axes.

8. The apparatus of claim 4, wherein the second end of either the first or the second member provides a connection to a downhole motor for transferring torque from the motor to the apparatus.

9. The apparatus of claim 4, wherein the connection comprises a polygon, thread, or spline connection.

10. A method of transferring torque via a constant velocity joint, comprising:
positioning two intermediary members of the constant velocity joint between a first and a second member of the constant velocity joint, wherein the first member comprises an outer surface connector to receive torque through, a plurality of grooves extending transversely across a recess in a first end of the first member, and a hole penetrated by a longitudinal axis of the first member, wherein the second member comprises an outer surface connector to transmit torque through, a plurality of tongues extending transversely across a portion of a protrusion in a first end of the second member and a hole penetrated by a longitudinal axis of the second member, and wherein each of the intermediary members comprises a plurality of grooves extending transversely across a recess in a first end and a plurality of tongues extending transversely across a portion of a protrusion in a second end of the intermediary members that are oriented perpendicular to each other, the intermediary members each comprising a hole penetrated by a longitudinal axis of a respective intermediary member;
coupling the first member to the second member by passing a coupling element that traverses the holes along the longitudinal axes of the first member, the second member, and the two intermediary members by applying a compressive force between the first and second members with a biasing mechanism of the coupling element wherein the first member rotates about the longitudinal axis of the first member and the second member rotates about the longitudinal axis of the second member during the transfer of torque between the first member and the second member; and
coupling a first sub rotatable about a rotation axis for transmitting torque from a second sub rotatable in a circular path about the rotation axis, wherein a second end of either the first or the second member couples to the first sub for rotation therewith.

11. The method of claim 10, further comprising:
prior to the coupling the first member to the second member, positioning a third intermediary member between the first and the second members, wherein the third intermediary member comprises a plurality of grooves in a first end and a plurality of tongues in a second end of the third intermediary member, wherein the third intermediary member includes a hole penetrated by a longitudinal axis of the third intermediary member, and wherein the plurality of grooves in the first end and the plurality of tongues in the second end of the third intermediary member are oriented perpendicular to each other.

12. The method of claim 10, further comprising:
rotating the first and second members to transfer torque along non-aligned longitudinal axes.

\* \* \* \* \*